US012384351B2

(12) United States Patent
Sato et al.

(10) Patent No.: US 12,384,351 B2
(45) Date of Patent: Aug. 12, 2025

(54) WORK MACHINE PARAMETER SELECTION DEVICE AND PARAMETER RECOMMENDATION SYSTEM

(71) Applicant: Hitachi Construction Machinery Co., Ltd., Tokyo (JP)

(72) Inventors: Jumpei Sato, Tokyo (JP); Kouichirou Ejiri, Yokohama (JP); Kazuhiro Oono, Tokyo (JP); Tomoki Yada, Kodaira (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/841,745

(22) PCT Filed: Feb. 15, 2023

(86) PCT No.: PCT/JP2023/005125
§ 371 (c)(1),
(2) Date: Aug. 27, 2024

(87) PCT Pub. No.: WO2023/162803
PCT Pub. Date: Aug. 31, 2023

(65) Prior Publication Data
US 2025/0162566 A1    May 22, 2025

(30) Foreign Application Priority Data
Feb. 28, 2022 (JP) ................. 2022-029092

(51) Int. Cl.
*B60W 10/06* (2006.01)
*G05D 1/222* (2024.01)
(Continued)

(52) U.S. Cl.
CPC ............. *B60W 10/06* (2013.01); *G05D 1/222* (2024.01); *B60W 30/1882* (2013.01);
(Continued)

(58) Field of Classification Search
CPC ............. B60W 10/06; B60W 2300/12; B60W 2520/10; B60W 2530/10; B60W 2552/15;
(Continued)

(56) References Cited

U.S. PATENT DOCUMENTS

2011/0313647 A1* 12/2011 Koebler ................. B60L 58/12
701/123
2015/0275787 A1* 10/2015 Dufford ............... B60W 30/188
701/112

(Continued)

FOREIGN PATENT DOCUMENTS

JP      2012-242110 A    12/2012
WO   WO 2015/136647 A1   9/2015

OTHER PUBLICATIONS

International Search Report (PCT/ISA/210) issued in PCT Application No. PCT/JP2023/005125 dated Apr. 4, 2023 with English translation (4 pages).

(Continued)

*Primary Examiner* — Roger L Pang
(74) *Attorney, Agent, or Firm* — Crowell & Moring LLP

(57) ABSTRACT

The present disclosure provides a parameter selection device for a work machine that enables the work machine to efficiently travel at a work site where a travel route or a slope changes from moment to moment. The parameter selection device includes a parameter selection section. The parameter selection section calculates an average loaded travel distance per cycle, a travel ratio for each slope in loaded travel, and a virtual travel distance for each slope per cycle of the work machine (processing P1-P3). Further, the parameter selection section calculates a predicted fuel consumption amount for each slope per cycle, a travel time for each slope per cycle, a predicted fuel consumption amount per unit load weight, and a predicted production amount per cycle (processing P4-P8). Then, the parameter selection section selects
(Continued)

a recommended parameter set, based on the predicted fuel consumption amount and the predicted production amount per cycle for each parameter set (processing P9).

4 Claims, 8 Drawing Sheets

(51) Int. Cl.
*B60W 30/188* (2012.01)
*G05D 105/05* (2024.01)
*G05D 107/70* (2024.01)
*G05D 109/10* (2024.01)

(52) U.S. Cl.
CPC ..... *B60W 2300/12* (2013.01); *B60W 2520/10* (2013.01); *B60W 2530/10* (2013.01); *B60W 2530/209* (2020.02); *B60W 2552/15* (2020.02); *B60W 2556/10* (2020.02); *B60W 2556/45* (2020.02); *B60W 2710/06* (2013.01); *G05D 2105/05* (2024.01); *G05D 2107/73* (2024.01); *G05D 2109/10* (2024.01)

(58) Field of Classification Search
CPC ......... B60W 2556/10; B60W 2556/45; B60W 30/1882; B60W 2710/06; G05D 1/222
USPC ................................ 701/54, 101, 102; 477/3
See application file for complete search history.

(56) References Cited

U.S. PATENT DOCUMENTS

| | | |
|---|---|---|
| 2016/0253853 A1 | 9/2016 | Yamamoto et al. |
| 2022/0244061 A1* | 8/2022 | Mellinger ......... B60W 30/1882 |
| 2023/0242111 A1* | 8/2023 | Aggoune .............. B60W 20/12 |
| | | 701/22 |

OTHER PUBLICATIONS

Japanese-language Written Opinion (PCT/ISA/237) issued in PCT Application No. PCT/JP2023/005125 dated Apr. 4, 2023 with English translation (7 pages).

Japanese-language International Preliminary Report on Patentability (PCT/IPEA/416 & PCT/IPEA/409) issued in PCT Application No. PCT/JP2023/005125 dated Jun. 11, 2024 (7 pages).

* cited by examiner

Fig. 2

| Travel history data RD ||||||
|---|---|---|---|---|---|
| Date and time DAT | Slope $\theta$ [°] | Speed V [km/h] | Weight of load PLD [t] | Parameter set PS | Fuel consumption amount FCH [l/h] |
| 9/24 10:53:01 | 0.51 | 15.0 | 301.2 | B | 0.1 |
| 9/24 10:53:02 | 0.52 | 14.9 | 301.2 | B | 0.1 |
| 9/24 10:53:03 | 0.49 | 15.1 | 301.2 | B | 0.1 |
| ⋮ | ⋮ | ⋮ | ⋮ | ⋮ | ⋮ |

Fig. 3

| Parameter set PS | | | |
|---|---|---|---|
| Set | Engine speed at low revolution NRL [rpm] | Engine speed at high revolution NRH [rpm] | Response speed RS |
| A | 1,300 | 1,900 | High |
| B | 1,200 | 1,800 | High |
| C | 1,200 | 1,800 | Medium |
| D | 1,100 | 1,700 | Low |
| E | 1,100 | 1,700 | Low |
| ⋮ | ⋮ | ⋮ | ⋮ |

Fig. 7

| Slope [°] | Accumulated travel distance [km] | Travel ratio [%] | Virtual travel distance for each slope [km/cycle] |
|---|---|---|---|
| 0 | ... | ... | ... |
| 1 | ... | ... | ... |
| ⋮ | ⋮ | ⋮ | ⋮ |

WORK MACHINE PARAMETER SELECTION DEVICE AND PARAMETER RECOMMENDATION SYSTEM

TECHNICAL FIELD

The present invention relates to a parameter selection device and a parameter recommendation system for a work machine.

BACKGROUND ART

Conventionally, there has been known an invention related to an energy consumption amount prediction device for a vehicle that predicts the energy consumption amount of the vehicle traveling a predetermined travel route. A conventional device described in Patent Literature 1 includes a fuel-converted gradient data storing means and a consumption amount calculation means. The fuel-converted gradient data storing means stores fuel-converted gradient data for links created by a road gradient data creation device in association with road map data. The consumption amount calculation means calculates an energy consumption amount of a vehicle that is predicted in traveling the travel route, using the fuel-converted gradient data for each link stored in the fuel-converted gradient data storing means (Patent Literature 1, paragraph 0019 and claim 7).

The road gradient data creation device described in Patent Literature 1 creates data indicating the gradient degree of each link in the road map data representing a road using a combination of nodes and links. The device includes a link data input means, an altitude data input means, and a gradient data creation means (Patent Literature 1, paragraph 0008 and claim 1). The link data input means inputs link data including positions of a start point and an end point of each link and a road type from a map database that records the road map data.

The altitude data input means inputs altitude data from an altitude database that records altitude of each position obtained by sectioning a topographical map by a mesh with a predetermined interval. The gradient data creation means creates, based on the link data and the altitude data, gradient data as an indicator showing the degree of a gradient of each link between the start point and the end point, as fuel-converted gradient data, by converting the gradient data into an energy consumption amount when a vehicle travels the link and evaluating it.

Further, conventionally, there has been known an invention related to a driving analysis device for a transport vehicle. A conventional device described in Patent Literature 2 is a driving analysis device for a transport vehicle that repeatedly travels the same route (paragraph 0007 and claim 1 of Patent Literature 2). The conventional device includes a data accumulation section, a data extraction section, a section extraction section, and a driving information output section. The data accumulation section acquires and stores in a storage device positional information during the travel of the transport vehicle and driving information including information on a fuel consumption amount and a load amount by setting data on one round travel on the route as data of one cycle.

The data extraction section extracts reference cycle data and analysis target cycle data from data of a plurality of cycles accumulated in the storage device. The section extraction section extracts an analysis target section from a plurality of sections set by dividing the route using the positional information. The driving information output section outputs the reference cycle data for the analysis target section and the driving information of the analysis target cycle data.

CITATION LIST

Patent Literature

Patent Literature 1: JP 2012-242110 A
Patent Literature 2: WO 2015/136647A1

SUMMARY OF INVENTION

Technical Problem

For example, at a work site such as a mining site, a route where a work machine such as a dump truck can travel or a gradient of the route where the work machine travels change from moment to moment as work progresses. As described above, the conventional device described in Patent Literature 1 creates the fuel-converted gradient data based on the link data recorded in the map database and the altitude data recorded in the altitude database. Therefore, in the conventional device, it is difficult to constantly update the map database and the altitude database to the latest state for such a work site where the travel route or the gradient changes from moment to moment.

Further, the conventional device described in Patent Literature 2 has a transport vehicle that repeatedly travels the same route as the analysis target. Therefore, it is difficult to perform driving analysis of the transport vehicle for the work site where the travel route or the gradient changes from moment to moment.

The present disclosure provides a parameter selection device and a parameter recommendation system for a work machine that enable the work machine to efficiently travel at a work site where a travel route or a slope changes from moment to moment.

Solution to Problem

One aspect of the present disclosure is a parameter selection device that selects a recommended parameter set for an engine based on travel history data including travel date and time, slopes of a travel route, a travel speed, a weight of a load, parameter sets for control of the engine, and a fuel consumption amount per unit time of a work machine, the parameter selection device including a parameter selection section, the parameter selection section being configured to: calculate an average loaded travel distance per one cycle based on the travel history data, the one cycle being set as a cycle in which the work machine is loaded with a load, performs loaded travel after being loaded with the load, unloads the load after the loaded travel, travels with no load after unloading the load, and is then reloaded with the load; calculate, based on the travel history data, a travel ratio for each slope as a ratio of an accumulated travel distance for each of the slopes relative to a total travel distance of the work machine in the loaded travel; calculate a virtual travel distance for each slope per the one cycle by multiplying the average loaded travel distance by the travel ratio for each slope; calculate, based on the travel history data, an average fuel consumption amount for each slope as an average value of the fuel consumption amount and an average speed for each slope as an average value of the travel speed, for each of the slopes in the loaded travel of the work machine; calculate a predicted fuel consumption amount for each slope per the one cycle by multiplying an average fuel efficiency for each slope, which is obtained by dividing the average fuel consumption amount for each slope by the average speed for each slope, by the virtual travel distance for each slope; calculate a travel time for each slope per the one cycle by dividing the virtual travel distance for each slope by the average speed for each slope; calculate, based on the travel history data, a predicted fuel consumption amount per unit load weight by dividing a predicted fuel consumption amount per the one cycle as a total of the predicted fuel consumption amount for each slope by a defined load weight of the work machine, for each of the parameter sets; calculate, based on the travel history data, a predicted production amount per the one cycle by dividing the defined load weight by a virtual travel time per the one cycle as a total of the travel time for each slope, for each of the parameter sets; and select the recommended parameter set, based on the predicted fuel consumption amount and the predicted production amount per the one cycle for each of the parameter sets.

Further, another aspect of the present disclosure is a parameter recommendation system including the parameter selection device and a control device mounted on the work machine, in which the control device includes: an engine control section that controls the engine based on the parameter sets; a travel record acquiring section that acquires the travel history data based on detection results from a sensor mounted on the work machine; and a travel record transmitting section that transmits the travel history data input from the travel record acquiring section to the parameter selection device via a communication device mounted on the work machine.

Advantageous Effects of Invention

According to the aforementioned aspect of the present disclosure, it is possible to provide a parameter selection device and a parameter recommendation system for a work machine that enable the work machine to efficiently travel at a work site where a travel route or a slope changes from moment to moment.

BRIEF DESCRIPTION OF DRAWINGS

FIG. 2 is a table showing an example of travel history data recorded in the parameter selection device of FIG. 1.

FIG. 3 is a table showing examples of a parameter set of FIG. 2.

FIG. 7 is a table showing an example of results of processing of calculating a virtual travel distance for each slope of FIG. 4.

DESCRIPTION OF EMBODIMENT

Hereinafter, with reference to the drawings, an embodiment of a parameter selection device and a parameter recommendation system according to the present disclosure will be described.

Figure 1:
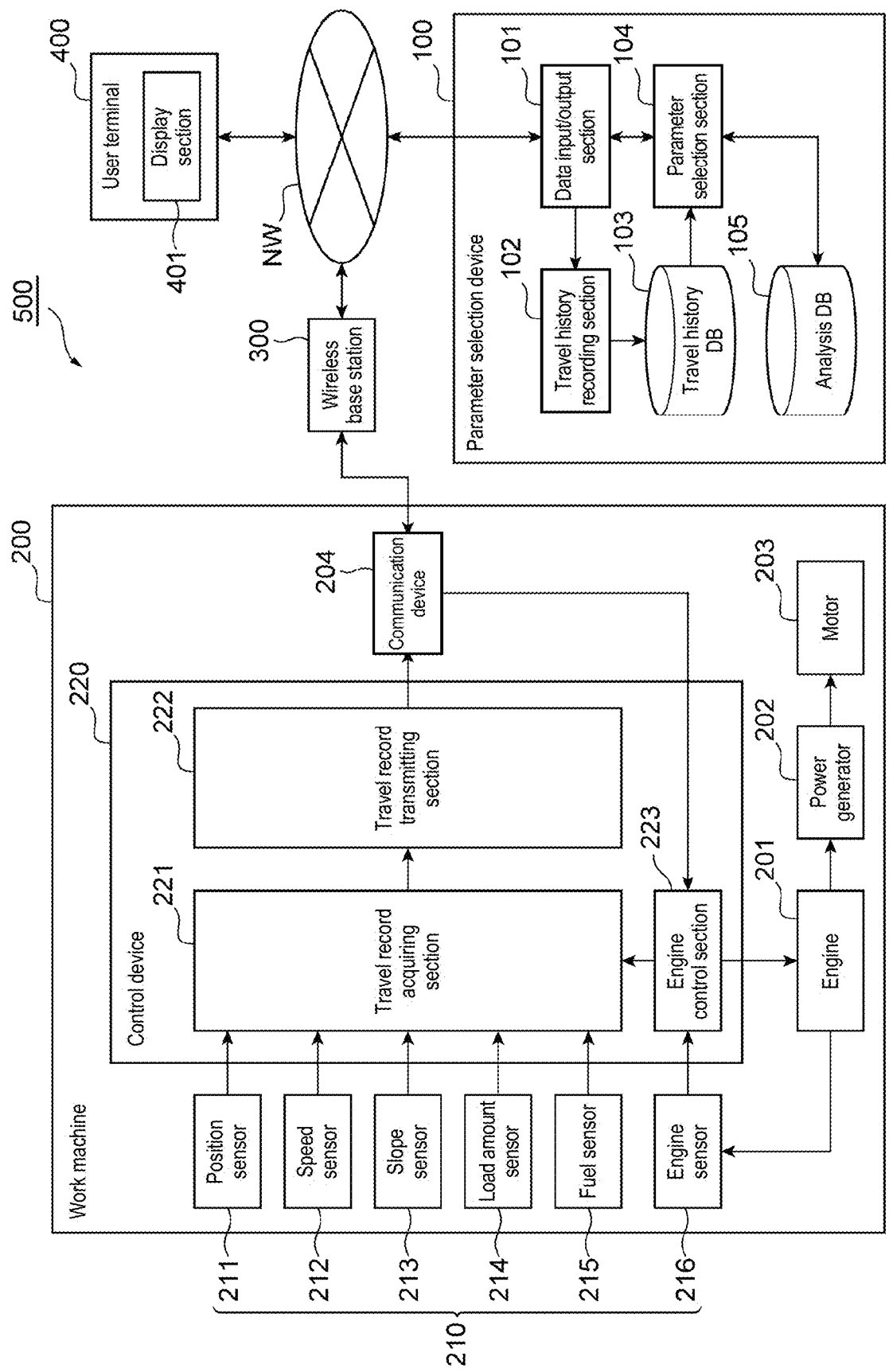
FIG. 1 is a block diagram showing an embodiment of a parameter selection device and a parameter recommendation system according to the present disclosure.

In the present disclosure, as a work machine, a dump truck as a transport machine used at mines or the like is expected, and control parameters (variables) of an engine as a power source will be explained as examples of parameters. FIG. 1 is a block diagram showing the embodiment of the parameter selection device and the parameter recommendation system according to the present disclosure. A parameter selection device 100 of the present embodiment is, for example, a computer connected to a network NW such as the Internet. The parameter selection device 100 includes, for example, a central processing device (CPU), a memory, a timer, and an input/output section.

The parameter selection device 100 is a device that selects a recommended parameter set for an engine 201 of a work machine 200 based on travel history data RD of the work machine 200. Although the details will be described later, the travel history data RD of the work machine 200 includes, for example, travel date and time DAT, a slope $\theta[°]$ of a travel route, a travel speed $V[km/h]$, a weight $PLD[t]$ of a load, a parameter set PS for the engine 201, and a fuel consumption amount $FCH[l/h]$ per unit time of the work machine 200 (see FIG. 2).

The parameter selection device 100 includes, for example, a data input/output section 101, a travel history recording section 102, a travel history database 103, a parameter selection section 104, and an analysis database 105. The sections of the parameter selection device 100 shown in FIG. 1 represent, for example, functions of the parameter selection device 100 that are implemented by the CPU of the parameter selection device 100 executing programs stored in the memory of the parameter selection device 100.

A parameter recommendation system 500 of the present embodiment includes, for example, the parameter selection device 100 and a control device 220 mounted on the work machine 200. Note that FIG. 1 shows one work machine 200 and one control device 220 mounted on the work machine 200, but the parameter recommendation system 500 may include a plurality of control devices 220 mounted on a plurality of work machines 200. Further, the parameter recommendation system 500 may include, for example, a wireless base station 300 connected to the network NW, and a user terminal 400 installed at an operation office of a user or the like and connected to the network NW.

The work machine 200 is, for example, a dump truck that conveys loads such as soil and sand and crushed stones. Further, the work machine 200 is, for example, a supersized rigid dump truck that conveys loads such as minerals at mines. Note that the work machine 200 is not limited to a dump truck, and may be, for example, another machine that can convey an object to be conveyed, such as a wheel loader and a hydraulic shovel.

The work machine 200 includes, for example, the engine 201, a power generator 202, a motor 203, a communication device 204, a sensor 210, and the control device 220. The engine 201 is, for example, an internal combustion engine fueled by gas oil or the like. An output shaft of the engine 201 is, for example, connected to a shaft of the power generator 202 and rotates the shaft of the power generator 202. The power generator 202 generates power such that for example, the shaft is rotated due to the rotation of the output shaft of the engine 201. The engine speed of the engine 201 is controlled by an accelerator (not shown), and in a case of a vehicle of attended operation, the engine speed is controlled to increase and decrease by the operation of an acceleration pedal.

The motor 203 is, for example, rotated by the electric power supplied from the power generator 202 so as to generate power to cause the work machine 200 to travel. More specifically, when the work machine 200 is a dump truck, the motor 203 is a travel motor to rotate the wheels of the dump truck. Note that the motor 203 may be rotated by the electric power supplied from a battery of the work machine 200 (illustration omitted). Further, the motor 203 may supply regenerated power generated by a regenerative brake to the battery, for example.

The communication device 204 is, for example, wireless communication equipment mounted on the work machine 200. The communication device 204 is, for example, connected to the wireless base station 300 through wireless communication, and connected to the network NW via the wireless base station 300. Further, the communication device 204 may be connected to the network NW through satellite communication via an antenna, a communication satellite, and a gateway, for example.

The sensor 210 is, for example, mounted on the work machine 200 and detects the physical amount on the work machine 200. The sensor 210 includes, for example, a position sensor 211, a speed sensor 212, a slope sensor 213, a load amount sensor 214, a fuel sensor 215, and an engine sensor 216.

The position sensor 211 includes, for example, a receiver of the Global Navigation Satellite System (GNSS) and detects positional information such as latitude and longitude of the work machine 200. The speed sensor 212 includes, for example, a wheel speed sensor and detects the speed of the work machine 200. The slope sensor 213 includes, for example, an inclination sensor, an inertial sensor, or an acceleration sensor and detects an inclination angle relative to a horizontal surface of the work machine 200.

The load amount sensor 214 detects, for example, the load amount of the work machine 200 based on the load exerted on a suspension that supports the wheels of the work machine 200. The fuel sensor 215 detects, for example, a remaining amount of fuel in a fuel tank based on a position of a float in the fuel tank. The engine sensor 216 detects, for example, an engine speed and a response speed (ratio of change in the engine speed to a depression amount of an acceleration pedal) of the engine 201 of the work machine 200.

The control device 220 is, for example, an electronic control unit (ECU) mounted on the work machine 200. The control device 220 can be configured with a micro controller including one or more of a CPU, a memory, a timer, and an input/output section, for example. The control device 220 includes, for example, a travel record acquiring section 221, a travel record transmitting section 222, and an engine control section 223. These sections of the control device 220 represent, for example, functions of the control device 220 that are implemented by the CPU executing programs stored in the memory.

The travel record acquiring section 221 acquires the travel history data RD based on detection results from the sensor 210 mounted on the work machine 200. More specifically, the travel record acquiring section 221 acquires, for example, detection results from the position sensor 211, the speed sensor 212, the slope sensor 213, the load amount sensor 214, and the fuel sensor 215. In this manner, the travel record acquiring section 221 acquires, for example, travel date and time DAT, a slope θ of a travel route, a travel speed V[km/h], a weight PLD[t] of a load, and a fuel consumption amount FCH[l/h] per unit time of the work machine 200. Further, the travel record acquiring section 221 acquires, for example, the parameter set for the engine 201 from the engine control section 223.

The travel record transmitting section 222 transmits the travel history data RD input from the travel record acquiring section 221 to the parameter selection device 100 via the communication device 204 mounted on the work machine 200. The engine control section 223 controls, for example, the engine 201 of the work machine 200 in response to an input from an acceleration pedal (not shown), based on the parameter set PS for control of the engine 201 described later and the detection results from the engine sensor 216.

The parameter selection device 100 receives, for example, by means of the data input/output section 101 connected to the network NW, the travel history data RD of the work machine 200 transmitted from the travel record transmitting section 222 of the control device 220 mounted on the work machine 200 via the communication device 204. The travel history recording section 102 records, in the travel history database 103, the travel history data RD received by means of the data input/output section 101.

FIG. 2 is a table showing an example of the travel history data RD recorded in the travel history database 103 of the parameter selection device 100 of FIG. 1. The travel history data RD of the work machine 200 includes, for example, travel date and time DAT, a slope θ[°] of a travel route, a travel speed V[km/h], a weight PLD[t] of a load, a parameter set PS for the engine 201, and a fuel consumption amount FCH[l/h] per unit time of the work machine 200. Further, the travel history data RD may include positional information on the work machine 200. The travel history recording section 102 of the parameter selection device 100, for example, records, in the travel history database 103, the travel history data RD received from a plurality of work machines 200 together with the identification information of the individual work machine 200.

The travel date and time DAT of the work machine 200 is, for example, date and time when the speed sensor 212 detects the speed of the work machine 200. The slope θ is, for example, an inclination angle relative to the horizontal surface of the work machine 200 detected by the slope sensor 213. The travel speed V[km/h] is, for example, the speed of the work machine 200 detected by the speed sensor 212. The weight PLD[t] of a load is, for example, a load amount of the work machine 200 detected by the load amount sensor 214. The fuel consumption amount FCH[l/h] is, for example, a consumption amount of fuel per unit time calculated based on the remaining amount of fuel detected by the fuel sensor 215. The positional information is, for example, information on the latitude and longitude of the work machine 200 detected by the position sensor 211 or the like.

FIG. 3 is a table showing examples of the parameter set PS for the engine 201 included in the travel history data RD of FIG. 2. The parameter set PS for the engine 201 is, for example, a combination of control parameters for the engine 201 preset at the engine control section 223 of the work machine 200. As shown in the table, the control parameters include each data on an engine speed at low revolution NRL[rpm], an engine speed at high revolution NRH[rpm], and a response speed RS, and include a plurality of different sets in accordance with the combinations. Herein, the engine speed at low revolution NRL is an idling engine speed when an acceleration pedal is not depressed, while the engine speed at high revolution NRH is the maximum engine speed when the acceleration pedal is fully depressed (so-called full operation).

In the example shown in FIG. 3, for a set A of the parameter sets PS, the engine speed at low revolution NRL[rpm] of the engine 201 is set at 1300 [rpm], the engine speed at high revolution NRH[rpm] is set at 1900 [rpm], and the response speed RS is set at "high." Further, for a set C of the parameter sets PS, the engine speed at low revolution NRL[rpm] of the engine 201 is set at 1200 [rpm], the engine speed at high revolution NRH[rpm] is set at 1800 [rpm], and the response speed RS is set at "medium."

In the engine control section 223 of the control device 220 mounted on the work machine 200, for example, one of a plurality of parameter sets PS as shown in FIG. 3 is selected and defined in advance. The engine control section 223, for example, controls the engine 201 based on the defined parameter set PS and the detection results from the engine sensor 216.

The wireless base station 300 shown in FIG. 1 is communicatably connected to the communication device 204 of the work machine 200 via a wireless communication line and is communicatably connected to the parameter selection device 100 via the network NW. Further, the user terminal 400 shown in FIG. 1 is installed at an operation office of a user, for example, and is communicatably connected to the parameter selection device 100 via the network NW. Furthermore, the user terminal 400 includes, for example, a display section 401 configured with a liquid crystal display device, an organic EL display device, and the like.

Figure 4:
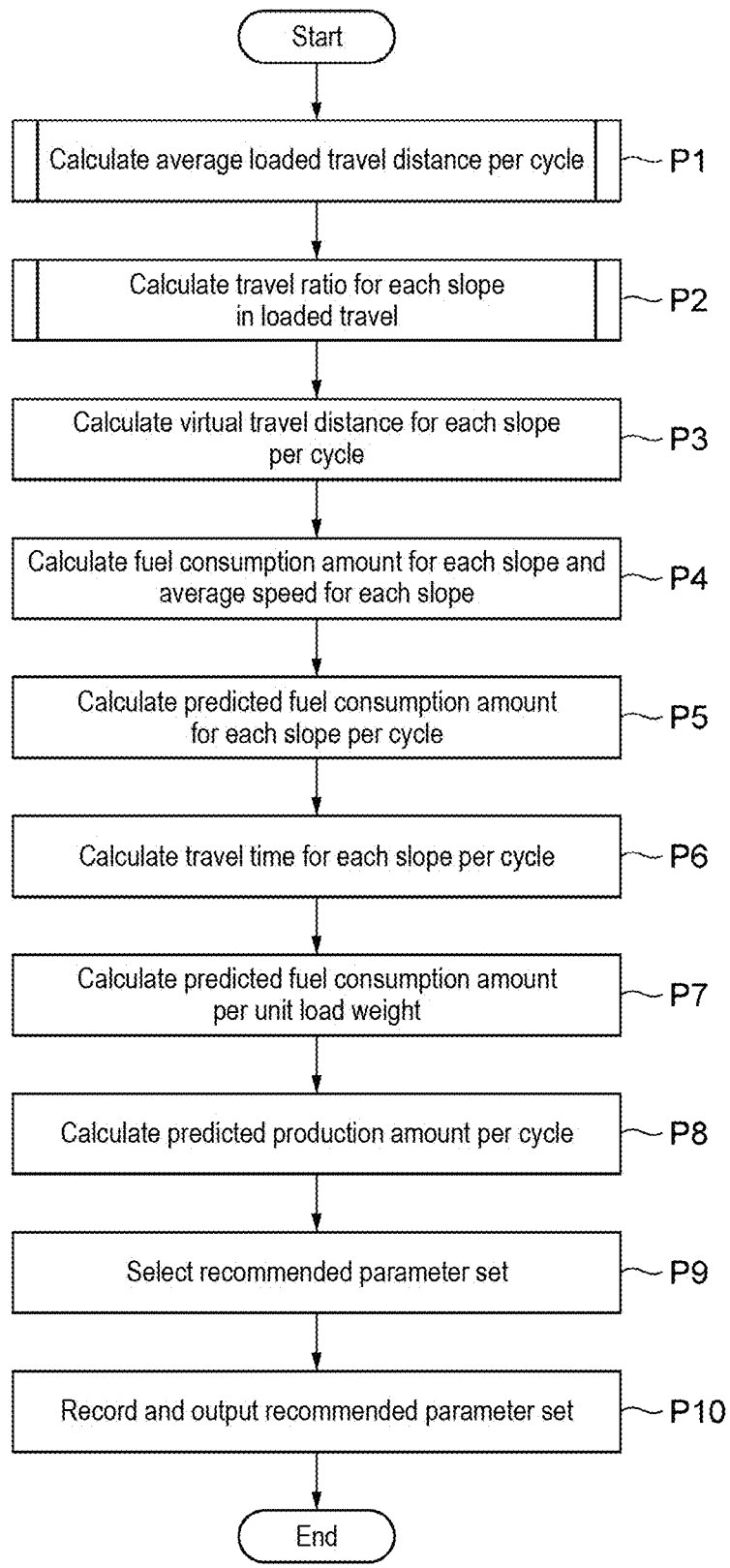
FIG. 4 is a flowchart showing operation of the parameter selection device of FIG. 1.

Hereinafter, with reference to FIG. 4, operation of the parameter selection device 100 of the present embodiment will be described. FIG. 4 is a flowchart showing an example of the operation of the parameter selection device 100 of FIG. 1.

In the parameter recommendation system 500 of the present embodiment, for example, a user of the work machine 200 who requires selection of a recommended parameter set for the engine 201 of a specific work machine 200 inputs identification information of the targeted work machine 200 into the user terminal 400. The identification information of the work machine 200 input into the user terminal 400 is, for example, transmitted from the user terminal 400 to the parameter selection device 100 via the network NW.

Upon receipt, by means of the data input/output section 101, of the identification information of the specific work machine 200 transmitted from the user terminal 400, for example, the parameter selection device 100 starts a processing flow shown in FIG. 4. Upon start of the processing flow shown in FIG. 4, the parameter selection device 100 first executes processing P1 of calculating an average loaded travel distance per cycle, based on the travel history data RD of the specific work machine 200 as an analysis target. Herein, one cycle is a cycle in which the work machine 200 is loaded with a load, performs loaded travel after being loaded with the load, unloads the load after the loaded travel, travels with no load after unloading the load, and is then reloaded with the load.

Figure 5:
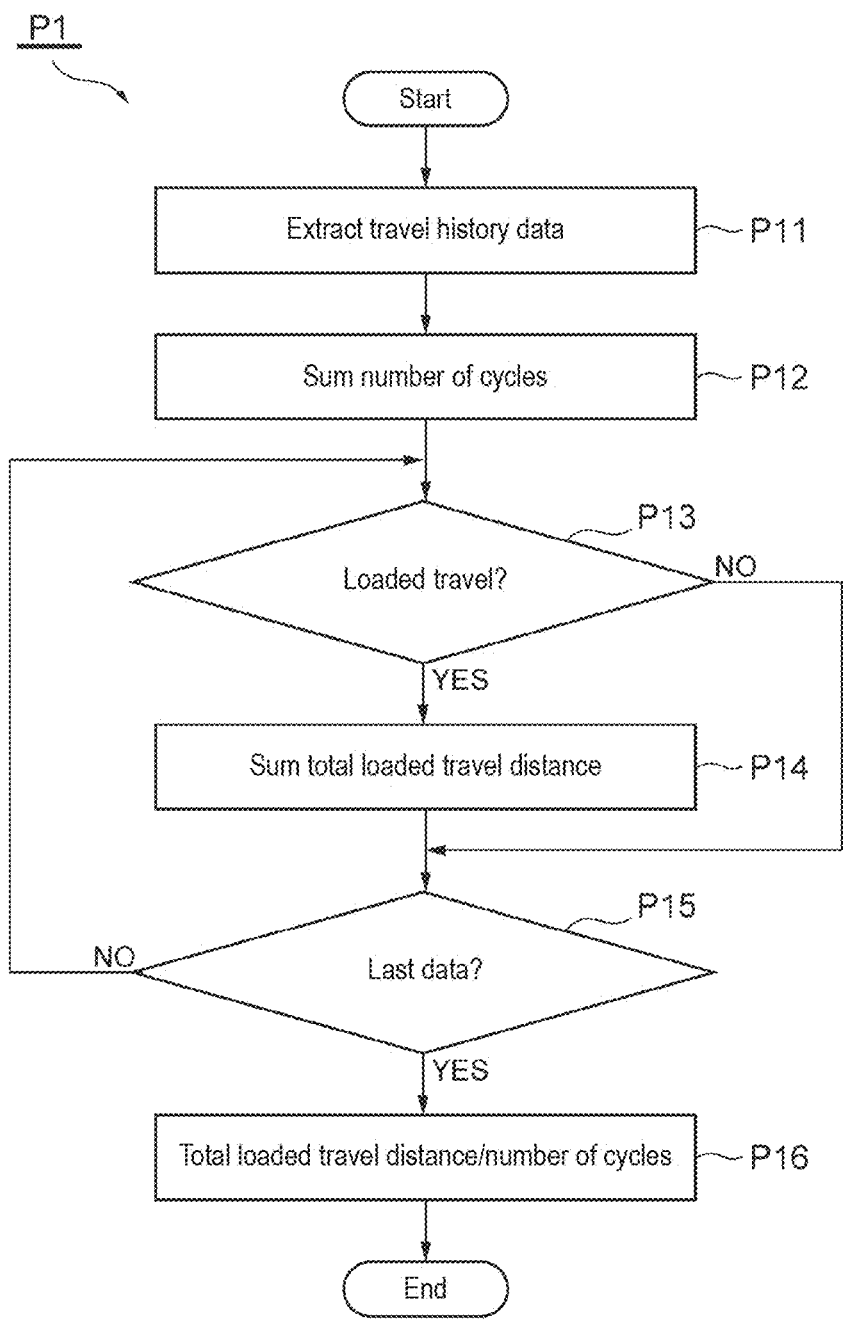
FIG. 5 is a flowchart detailing processing of calculating an average loaded travel distance of FIG. 4.

FIG. 5 is a flowchart detailing the processing P1 of calculating the average loaded travel distance per cycle of FIG. 4. Upon start of the processing P1 shown in FIG. 5, the parameter selection device 100 first executes processing P11 of extracting the travel history data RD of the specific work machine 200 as the analysis target from the travel history database 103. More specifically, in the processing P11, the parameter selection section 104, for example, acquires the identification information of the specific work machine 200 as the analysis target from the data input/output section 101. Further, the parameter selection section 104, for example, extracts, from the travel history database 103, the travel history data RD of the work machine 200 including identification information matching the identification information acquired from the data input/output section 101.

Next, the parameter selection device 100 executes processing P12 of summing the number of cycles based on the extracted travel history data RD. In the processing P12, for example, the parameter selection section 104 determines the presence or absence of the load on a time series in the travel history data RD by comparing a threshold value for the weight PLD[t] of the load for determining the presence or absence of the load on the work machine 200 and the weight PLD[t] of the load included in the travel history data RD.

The parameter selection section 104, for example, sums the number of cycles of the work machine 200 from the travel history data RD, based on the determination result of the presence or absence of the load on the work machine 200 and the positional information on the work machine 200. Herein, the number of cycles of the work machine 200 is, for example, the number of cycles, by setting, as one cycle, a cycle in which the work machine 200 is loaded with a load, performs loaded travel after being loaded with the load, unloads the load after the loaded travel, travels with no load after unloading the load, and is then reloaded with the load, as described above.

Next, the parameter selection device 100 executes processing P13, P14, P15 of summing a loaded travel distance at which the work machine 200 travels with a load. More specifically, in the processing P13, the parameter selection section 104, for example, extracts data of the oldest date and time from the travel history data RD on the time series. Further, the parameter selection section 104 determines whether the work machine 200 is performing loaded travel, based on the comparison between the weight PLD[t] of the load of the extracted data and the threshold value.

When it is determined in the processing P13 that the work machine 200 is performing loaded travel (YES), the parameter selection section 104 executes the processing P14 of summing a total loaded travel distance. In the processing P14, the parameter selection section 104 sums the total loaded travel distance by multiplying the travel speed V[km/h] of the work machine 200 by a travel time to calculate the loaded travel distance and adding the calculated loaded travel distance to the total loaded travel distance calculated in the previous processing P14. Note that in the processing P14 first executed after starting the processing P1, for example, the calculated loaded travel distance is added to zero as an initial value of the total loaded travel distance.

Thereafter, the parameter selection section 104 executes the processing P15 of determining whether the data extracted from the travel history data RD is the last data. When it is determined in the processing P15 that the data extracted from the travel history data RD is not the last data (NO), the parameter selection section 104 returns to the processing P13 to extract the next data in the travel history data RD and determines whether the work machine 200 is performing loaded travel.

Meanwhile, when it is determined in the aforementioned processing P13 that the work machine 200 is traveling without a load, that is, the work machine 200 is not performing loaded travel (NO), the parameter selection section 104 executes the processing P15 without executing the processing P14. Further, when it is determined in the aforementioned processing P15 that the data extracted from the travel history data RD is the last data (YES), the parameter selection section 104 executes the subsequent processing P16.

In the processing P16, the parameter selection section 104 calculates the average loaded travel distance per cycle by dividing the total loaded travel distance summed in the processing P14 by the number of cycles summed in the processing P12. In the aforementioned manner, the processing P1 shown in FIG. 5 ends. Thereafter, the parameter selection device 100 executes processing P2 shown in FIG. 4 and calculates, based on the travel history data RD, a travel ratio for each slope as a ratio of an accumulated travel distance for each slope θ to the total travel distance of the work machine 200 in the loaded travel.

Figure 6:
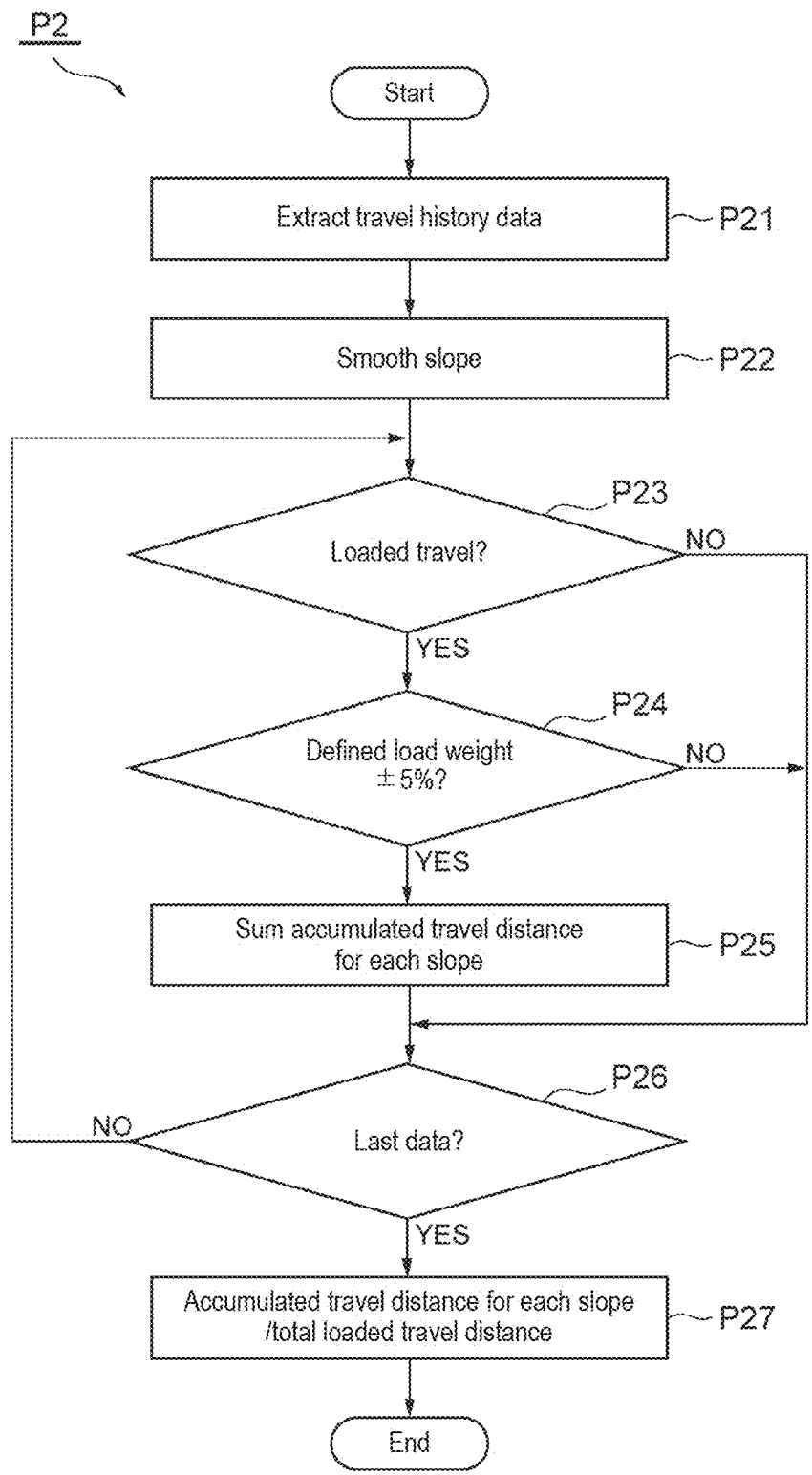
FIG. 6 is a flowchart detailing processing of calculating a travel ratio for each slope of FIG. 4.

FIG. 6 is a flowchart detaining the processing P2 of calculating the travel ratio for each slope of FIG. 4. Upon start of the processing P2 shown in FIG. 6, the parameter selection device 100 executes processing P21 of extracting the travel history data RD of the work machine 200 as the analysis target from the travel history database 103. More specifically, in the processing P21, in the same manner as in the aforementioned processing P11, the parameter selection section 104 extracts, from the travel history database 103, the travel history data RD including the identification information matching the identification information of the work machine 200 acquired from the data input/output section 101.

Next, the parameter selection section 104, for example, executes processing P22 of smoothing the slope θ included in the extracted travel history data RD on the time series to remove noise included in the detection results from the slope sensor 213. Next, in the same manner as in the aforementioned processing P13, the parameter selection section 104, for example, executes processing P23 of determining whether the work machine 200 is performing loaded travel in the data extracted from the travel history data RD.

When it is determined in the processing P23 that the work machine 200 is performing loaded travel (YES), the parameter selection section 104 executes processing P24 of determining whether the weight PLD[t] of the load is within ±5% of a defined load weight. Note that when the work machine 200 is a rigid dump truck, the defined load weight of the work machine 200 is, for example, around 300[t].

When it is determined in the processing P24 that the weight PLD[t] of the load is within the range of ±5% of the defined load weight (YES), the parameter selection section 104 executes processing P25 of summing an accumulated travel distance for each slope. In the processing P25, the parameter selection section 104 calculates the travel distance for the specific slope θ, based on the specific slope θ, the travel speed V[km/h], and the travel time that are included in the travel history data RD.

Further, the parameter selection section 104 adds the calculated travel distance for the specific slope θ to the accumulated travel distance for each slope for the specific slope θ calculated in the previous processing P25. Note that in the processing P25, when the travel distance is first calculated for the specific slope θ, the travel distance for the specific slope θ is added to zero as an initial value for the accumulated travel distance for each slope for the specific slope θ.

Thereafter, the parameter selection section 104 executes processing P26, and in the same manner as in the aforementioned processing P15, when it is determined that the data extracted from the travel history data RD is not the last data (NO), the parameter selection section 104 returns to the processing 23 to extract the next data in the travel history data RD and determines whether the work machine 200 is performing loaded travel.

Meanwhile, when it is determined in the aforementioned processing P23 that the work machine 200 is traveling without a load, that is, the work machine 200 is not performing loaded travel (NO), the parameter selection section 104 executes the processing P26 without executing the processing P24 and the processing P25. Further, also when it is determined in the aforementioned processing P24 that the weight of the load PLD[t] is out of the range of ±5% of the defined load weight (NO), the parameter selection section 104 executes the processing P26 without executing the processing P24 and the processing P25.

In this manner, by executing the processing P25 after the aforementioned processing P23 and processing P24, it is possible to sum the accumulated travel distance for each slope by extracting data with the equivalent weight PLD[t] of the load from the travel history data RD. Further, when it is determined in the previous processing P26 that the data extracted from the travel history data RD is the last data (YES), the parameter selection section 104 executes the subsequent processing P27.

In the processing P27, the parameter selection section 104 calculates a travel ratio for each slope in the loaded travel by dividing the accumulated travel distance for each slope summed in the processing P25 by the total loaded travel distance summed in the processing P14. By performing the processing P27, the ratio of the accumulated travel distance for each slope θ to the total loaded travel distance of the work machine 200 can be obtained. In the aforementioned manner, the processing P2 shown in FIG. 6 ends.

Thereafter, the parameter selection device 100 executes processing P3 shown in FIG. 4. In the processing P3, the parameter selection section 104, for example, calculates a virtual travel distance for each slope per cycle by multiplying the average loaded travel distance calculated in the processing P1 by the travel ratio for each slope calculated in the processing P2. Further, the parameter selection section 104 records the calculated virtual travel distance for each slope per cycle in the analysis database 105 shown in FIG. 1.

FIG. 7 is a table showing an example of a virtual route table recorded in the analysis database 105 as a result of performing the processing P3 of calculating the virtual travel distance for each slope per cycle of FIG. 4. The virtual route table includes, for example, the accumulated travel distance, the travel ratio to the total loaded travel distance, and the virtual travel distance per cycle, i.e., the virtual travel distance for each slope, for each slope θ regarding the work machine 200 with the specific identification information as the analysis target. The travel ratio for each slope θ is represented, for example, on a percentage basis having the total loaded travel distance as 100.

Next, the parameter selection device 100 executes processing P4 shown in FIG. 4. In the processing P4, for example, in the same manner as in the aforementioned processing P21 to processing P24, the parameter selection section 104 extracts the data on the loaded travel from the travel history data RD to calculate an average fuel consumption amount for each slope and an average speed for each slope. Herein, the average fuel consumption amount for each slope is the average value of the fuel consumption amount [l/h] for each slope θ in the loaded travel of the work machine 200. Further, the average speed for each slope is the average value of the travel speed V[km/h] for each slope θ in the loaded travel of the work machine 200. Note that the numerical values calculated in the processing P4 to P8 shown below are calculated for each set of the parameter sets PS.

Further, in the processing P4, the parameter selection section 104, for example, performs smoothing of the calculated average fuel consumption amount for each slope and average speed for each slope. By performing this, the average fuel consumption amount for each slope and the average speed for each slope that are smoothed can be obtained for each parameter set PS. Herein, the parameter sets PS included in the travel history data RD include a plurality of sets as stated above. Therefore, the average fuel consumption amount for each slope and the average speed for each slope are calculated for each set of the parameter sets PS.

Next, the parameter selection device 100 executes processing P5 shown in FIG. 4. In the processing P5, the parameter selection section 104, for example, calculates an average fuel efficiency[l/km] for each slope obtained by dividing the average fuel consumption amount[l/h] for each slope obtained in the previous processing P4 by the average speed[km/h] for each slope similarly obtained in the previous processing P4. Further, the parameter selection section 104 calculates a predicted fuel consumption amount[l] for each slope per cycle by multiplying the calculated average fuel efficiency[l/km] for each slope by the virtual travel distance[km] for each slope calculated in the processing P3. The predicted fuel consumption amount[l] for each slope is calculated for each set included in the parameter sets PS.

Next, the parameter selection device 100 executes processing P6 shown in FIG. 4. In the processing P6, the parameter selection section 104, for example, calculates a travel time[h] for each slope per cycle by dividing the virtual travel distance[km] for each slope calculated in the processing P3 by the average speed[km/h] for each slope calculated in the processing P4. The travel time[h] for each slope is calculated for each set included in the parameter sets PS.

Next, the parameter selection device 100 executes processing P7 shown in FIG. 4. In the processing P7, the parameter selection section 104, for example, calculates a predicted fuel consumption amount[l/t] per unit load weight per cycle by dividing the predicted fuel consumption amount [l] per cycle as a total of the predicted fuel consumption amount[l] for each slope per cycle by the defined load weight[t] of the work machine 200, based on the travel history data RD, for each parameter set PS. The predicted fuel consumption amount[l/t] is calculated for each set included in the parameter sets PS.

Next, the parameter selection device 100 executes processing P8 shown in FIG. 4. In the processing P8, the parameter selection section 104, for example, calculates a predicted production amount[t/h] per cycle by dividing the defined load weight[t] of the work machine 200 by a virtual travel time "h" per cycle as a total of the travel time for each slope, based on the travel history data RD for each parameter set PS. The predicted production amount[t/h] is calculated for each set included in the parameter sets PS.

Next, the parameter selection device 100 executes processing P9 shown in FIG. 4. In the processing P9, the parameter selection section 104, for example, selects a recommended parameter set based on the predicted fuel consumption amount[l/t] and the predicted production amount[t/h] per cycle for each parameter set PS that are calculated in the processing P7 and the processing P8.

Figure 8:
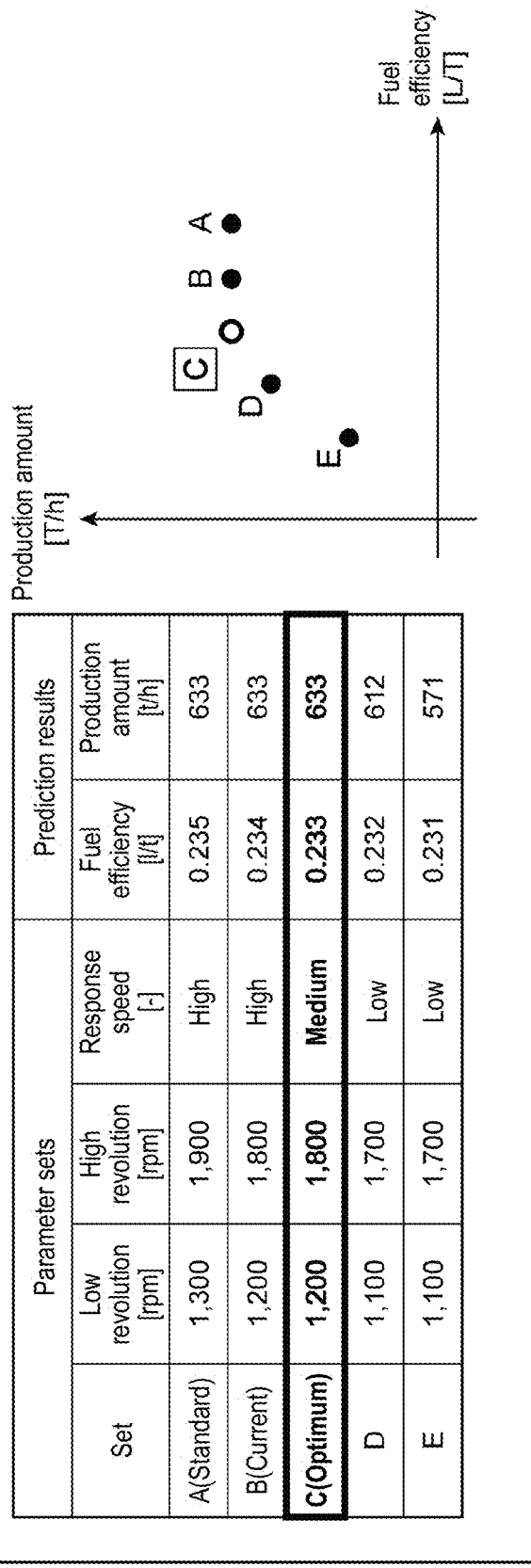
FIG. 8 is an image chart showing an example of output results of a recommended parameter set of FIG. 4.

FIG. 8 is an image chart showing an example of output results of the recommended parameter set selected in the processing P9 of FIG. 4. In the example shown in FIG. 8, the current parameter set PS for the engine 201 of the work machine 200 as the analysis target is a set B. In the set B, the engine speed at low revolution of the engine 201 is 1200 [rpm], the engine speed at high revolution is 1800 [rpm], and the response speed is high. In the set B of the parameter sets PS, the predicted fuel consumption amount is 0.234 [l/t], and the predicted production amount is 633 [t/h].

By contrast, when the parameter set PS for the engine 201 of the work machine 200 is changed from the current set B to a set C, the response speed of the engine 201 is changed from high to medium. As a result, it is possible to reduce the predicted fuel consumption amount from 0.234 [l/t] to 0.233 [l/t] without reducing the predicted production amount per cycle. Therefore, in the aforementioned processing P9, the parameter selection device 100, for example, selects the set C with the fewest predicted fuel consumption amount as the recommended parameter set, from the sets A, B, C as the parameter sets PS with the highest predicted production amount. Note that in the processing P9, the method for selecting the recommended parameter set based on the predicted fuel consumption amount and the predicted production amount is not particularly limited, and the recommended parameter set can be appropriately set by the user considering the balance between the fuel efficiency and the production amount.

Finally, the parameter selection device 100, for example, executes the processing P10 of recording and outputting the recommended parameter set. In the processing P10, the parameter selection section 104, for example, records the recommended parameter set for the specific work machine 200 as the analysis target in the analysis database 105. Further, the parameter selection section 104, for example, outputs the recommended parameter set for the specific work machine 200 as the analysis target to at least one of the work machine 200 and the user terminal 400 via the data input/output section 101.

That is, the parameter selection device 100, for example, transmits the recommended parameter set selected by the parameter selection section 104 in the processing P9 to the user terminal 400 via the data input/output section 101. In this case, the user terminal 400 can display the recommended parameter set received from the data input/output section 101 on the display section 401 as shown in FIG. 8.

Further, the parameter selection device 100, for example, transmits the recommended parameter set selected by the parameter selection section 104 in the processing P9 to the communication device 204 of the work machine 200 via the data input/output section 101. In this case, the engine control section 223 controls the engine 201 based on the recommended parameter set received from the data input/output section 101 via the communication device 204. After the processing P10 of recording and outputting the recommended parameter set ends, the parameter selection device 100 ends the processing flow shown in FIG. 4.

As described above, the parameter selection device 100 of the present embodiment is a device that selects the recommended parameter set for the engine 201 of the work machine 200 based on the travel history data RD of the work machine 200, and includes the parameter selection section 104. As shown in FIG. 2, the travel history data RD includes travel date and time DAT, a slope θ of a travel route, a travel speed V[km/h], a weight PLD[t] of a load, parameter sets PS for the engine 201, and a fuel consumption amount FCH[l/h] per unit time of the work machine 200. As shown in FIG. 4, the parameter selection section 104 calculates (processing P1) the average loaded travel distance per cycle based on the travel history data RD. Herein, one cycle is a cycle in which the work machine 200 is loaded with a load, performs loaded travel after being loaded with the load, unloads the load after the loaded travel, travels with no load after unloading the load, and is then reloaded with the load. Further, the parameter selection section 104 calculates (processing P2) the travel ratio for each slope that is the ratio of the accumulated travel distance for each slope θ relative to the total travel distance of the work machine 200 in the loaded travel, based on the travel history data RD. Furthermore, the parameter selection section 104 calculates (processing P3) the virtual travel distance for each slope per cycle by multiplying the average loaded travel distance by the travel ratio for each slope. In addition, the parameter selection section 104 calculates (processing P4) the average fuel consumption amount for each slope as the average value of the fuel consumption amount FCH[l/h] and the average speed for each slope as the average value of the travel speed V[km/h] for each slope θ in the loaded travel of the work machine 200, based on the travel history data RD. Further, the parameter selection section 104 calculates (processing P5) the predicted fuel consumption amount for each slope per cycle by multiplying the average fuel efficiency for each slope, which is obtained by dividing the average fuel consumption amount for each slope by the average speed for each slope, by the virtual travel distance for each slope. Furthermore, the parameter selection section 104 calculates (processing P6) the travel time for each slope per cycle by dividing the virtual travel distance for each slope by the average speed for each slope. In addition, the parameter selection section 104 calculates (processing P7) the predicted fuel consumption amount per unit load weight by dividing the predicted fuel consumption amount per cycle as a total of the predicted fuel consumption amount for each slope by the defined load weight of the work machine 200 for each parameter set PS based on the travel history data RD. Further, the parameter selection section 104 calculates (processing P8) the predicted production amount per cycle by dividing the defined load weight by the virtual travel time per cycle as a total of the travel time for each slope for each parameter set PS based on the travel history data RD. Then, as shown in FIG. 8, the parameter selection section 104 selects (processing P9) the recommended parameter set based on the predicted fuel consumption amount and the predicted production amount per cycle for each parameter set PS.

With such configurations, according to the parameter selection device 100 of the present embodiment, it is possible to calculate the virtual travel distance for each slope on the virtual travel route where the work machine 200 performs loaded travel per cycle, by summing the travel history data RD of the work machine 200. Further, using the virtual travel distance for each slope, it is possible to calculate the predicted fuel consumption amount per unit load weight and the predicted production amount per cycle of the work machine 200 for each parameter set PS for the engine 201. Thus, it is possible to select the recommended parameter set from a plurality of parameter sets PS, considering the balance between the predicted fuel consumption amount and the predicted production amount, under uniform conditions, at a work site such as a mining site where the route that the work machine 200 can travel or the gradient of the route where the work machine 200 travels changes from moment to moment as work progresses. Therefore, according to the present embodiment, it is possible to provide the parameter selection device 100 that enables the work machine 200 to efficiently travel at a work site where the travel route or the slope θ changes from moment to moment.

Further, the parameter recommendation system 500 of the present embodiment includes the aforementioned parameter selection device 100 and the control device 220 mounted on the work machine 200. The control device 220 includes the engine control section 223, the travel record acquiring section 221, and the travel record transmitting section 222. The engine control section 223 controls the engine 201 based on the parameter set PS. The travel record acquiring section 221 acquires the travel history data RD based on the detection results from the sensor 210 mounted on the work machine 200. The travel record transmitting section 222 transmits the travel history data RD input from the travel record acquiring section 221 to the parameter selection device 100 via the communication device 204 mounted on the work machine 200.

With such configurations, according to the parameter recommendation system 500 of the present embodiment, it is possible to acquire the travel history data RD of the work machine 200 by means of the control device 220 mounted on the work machine 200 to transmit the travel history data RD to the parameter selection device 100 via the communication device 204 of the work machine 200.

Further, the parameter recommendation system 500 of the present embodiment further includes the user terminal 400 that is communicatably connected to the parameter selection device 100. Furthermore, the parameter selection device 100 transmits the recommended parameter set for the engine 201 of the work machine 200 to the user terminal 400. In addition, the user terminal 400 includes the display section 401 that displays the recommended parameter set received from the parameter selection device 100.

With such configurations, according to the parameter recommendation system 500 of the present embodiment, the user of the work machine 200 can change the setting for the work machine 200, by referring to the recommended parameter set for the engine 201 that is displayed on the display section 401 of the user terminal 400.

Further, in the parameter recommendation system 500 of the present embodiment, the parameter selection device 100 transmits the recommended parameter set for the engine 201 to the work machine 200. Further, the engine control section 223 of the control device 220 mounted on the work machine 200 controls the engine 201 based on the recommended parameter set received from the data input/output section 101 via the communication device 204.

With such configurations, according to the present embodiment, it is possible to provide the parameter recommendation system 500 that enables the work machine 200 to efficiently travel at a work site where the travel route or the slope θ changes from moment to moment.

The embodiment of the parameter selection device and the parameter recommendation system according to the present disclosure has been described in detail above with reference to the drawings, but the specific configuration is not limited to that of the embodiment, and any design change and the like within the range without departing from the gist of the present disclosure are included in the present disclosure.

REFERENCE SIGNS LIST

100 Parameter selection device
104 Parameter selection section
200 Work machine
201 Engine
204 Communication device
210 Sensor
220 Control device
221 Travel record acquiring section
222 Travel record transmitting section
223 Engine control section
400 User terminal 401 Display section
DAT Travel date and time
FCH Fuel consumption amount per unit time
PLD Weight of load
PS Parameter set
RD Travel history data
V Travel speed
θ Slope

The invention claimed is:

1. A parameter selection device that selects a recommended parameter set for an engine based on travel history data including travel date and time, slopes of a travel route, a travel speed, a weight of a load, parameter sets for control of the engine, and a fuel consumption amount per unit time of a work machine, the parameter selection device comprising a parameter selection section, the parameter selection section being configured to:
   calculate an average loaded travel distance per one cycle based on the travel history data, the one cycle being set as a cycle in which the work machine is loaded with a load, performs loaded travel after being loaded with the load, unloads the load after the loaded travel, travels with no load after unloading the load, and is then reloaded with the load;
   calculate, based on the travel history data, a travel ratio for each slope as a ratio of an accumulated travel distance for each of the slopes relative to a total travel distance of the work machine in the loaded travel;
   calculate a virtual travel distance for each slope per the one cycle by multiplying the average loaded travel distance by the travel ratio for each slope;
   calculate, based on the travel history data, an average fuel consumption amount for each slope as an average value of the fuel consumption amount and an average speed for each slope as an average value of the travel speed, for each of the slopes in the loaded travel of the work machine;
   calculate a predicted fuel consumption amount for each slope per the one cycle by multiplying an average fuel efficiency for each slope, which is obtained by dividing the average fuel consumption amount for each slope by the average speed for each slope, by the virtual travel distance for each slope;
   calculate a travel time for each slope per the one cycle by dividing the virtual travel distance for each slope by the average speed for each slope;
   calculate, based on the travel history data, a predicted fuel consumption amount per unit load weight by dividing a predicted fuel consumption amount per the one cycle as a total of the predicted fuel consumption amount for each slope by a defined load weight of the work machine, for each of the parameter sets;
   calculate, based on the travel history data, a predicted production amount per the one cycle by dividing the defined load weight by a virtual travel time per the one cycle as a total of the travel time for each slope, for each of the parameter sets; and
   select the recommended parameter set, based on the predicted fuel consumption amount and the predicted production amount per the one cycle for each of the parameter sets.

2. A parameter recommendation system comprising the parameter selection device according to claim 1 and a control device mounted on the work machine,
   wherein
   the control device comprises:
      an engine control section that controls the engine based on the parameter sets;
      a travel record acquiring section that acquires the travel history data based on detection results from a sensor mounted on the work machine; and
      a travel record transmitting section that transmits the travel history data input from the travel record acquiring section to the parameter selection device via a communication device mounted on the work machine.

3. The parameter recommendation system according to claim 2, further comprising a user terminal communicatably connected to the parameter selection device, wherein
   the parameter selection device transmits the recommended parameter set to the user terminal, and
   the user terminal includes a display section that displays the recommended parameter set received from the parameter selection device.

4. The parameter recommendation system according to claim 2, wherein
   the parameter selection device transmits the recommended parameter set to the work machine, and
   the engine control section controls the engine based on the recommended parameter set received from the parameter selection device via the communication device.

* * * * *